Feb. 25, 1941.   H. A. BREIHAN   2,232,689
CAMBER GAUGE
Filed April 17, 1939
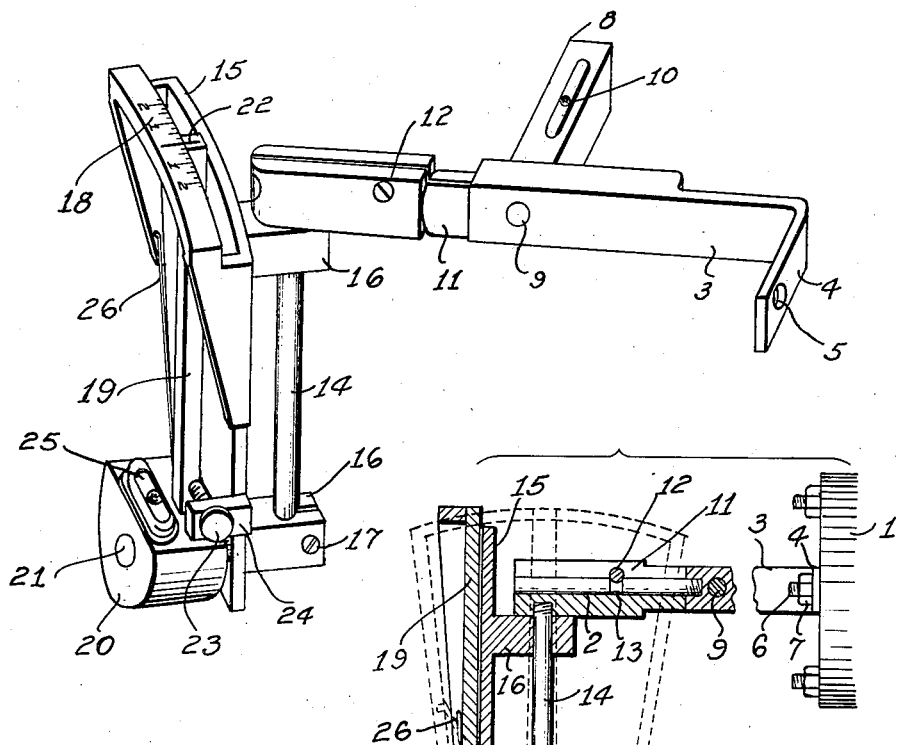
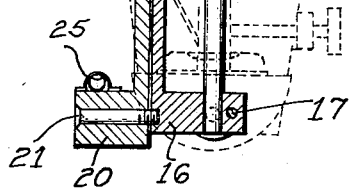
Inventor
HENRY A. BREIHAN
By:- Ben V. Gillman
Attorney Patented Feb. 25, 1941

2,232,689

UNITED STATES PATENT OFFICE 2,232,689

CAMBER GAUGE

Henry A. Breihan, St. Louis, Mo.

Application April 17, 1939, Serial No. 268,281

5 Claims. (Cl. 33—203)

This invention relates to gauges, and more particularly to a gauge for measuring the camber of any rotationally mounted member, such as an automobile wheel, so that the said member may be thereafter adjusted to the desired camber predetermined for that particular member, or perhaps be adjusted to have it without any camber whatsoever.

The invention has among its objects the production of such a gauge that will be simple and sturdy in construction, easy to operate, and which will be otherwise satisfactory and efficient for the uses for which it is found applicable.

One of the principal objects of this invention is to provide a camber gauge that is so small and compact that it may be very readily and conveniently applied to substantially all types of rotary members whose camber is desired to be measured, and so that even though there are overhanging parts adjacent to said rotary member, such overhanging parts will not interfere with the proper manipulation of said gauge.

Another object of my invention is to provide a gauge of the kind described, that will be extremely economical to make, and which will be self-contained and will not require any subsidiary floor-boards, bases, mountings, or the like, in order to use said gauge.

An added object of my invention is to provide a gauge of the kind described, wherein the amount gauge of the kind described, wherein the amount of camber, in degrees, may be read off the gauge to a very fine point, as for example, to a quarter-degree, and whereby the subsequent adjustment of the member being measured may be similarly accurately made.

Many other objects and advantages of the construction herein shown and described will be obvious to those skilled in the art to which this invention appertains, as will be more clearly apparent from the disclosures herein given.

To this end, my invention consists in the novel construction, arrangement and combination of parts herein shown and described, and the uses mentioned, as will be more clearly pointed out in the claims hereunto appended.

In the drawing, wherein like reference characters indicate like or corresponding parts throughout the views, Figure 1 is a perspective view of my improved gauge, ready to be mounted to the rotary member whose camber is to be measured; and Figure 2 is a vertical cross-sectional view of the same, applied to the rotary member, and showing in dotted lines another position of the scale element and associated parts.

Referring more clearly to the drawing, wherein I have illustrated a preferred embodiment of the invention, 1 indicates one end of any rotary member whose camber is to be measured, for inspection and consequent adjustment if needed, as for example, one of the wheels of an automobile. The front wheels of the various makes of automobiles are factory adjusted for predetermined amounts of camber, but even though these amounts are small, it is quite important and essential that the wheels be kept at the predetermined camber, for efficient operation of the car and proper wear on the tires.

The gauge is provided with a rigid element 2 of any suitable size, shape and length, as for example in the shape of the pin shown, and if required, may be provided with an extension 3 having a bent portion 4 provided with an aperture 5, ing a bent portion 4 provided with an aperture 5, whereby the entire device may be detachably mounted on one of the wheel mounting studs or bolts 6, and after which the nut 7 may be tightened to rigidly secure the device in fastened position.

A spirit level 8 is carried by the element 2, or by the extension thereof, the same extending substantially parallel to the plane of securement of the element 2 to the face of the member 1 to which the device is mounted; hence the axis of the level is always at right angles to the longitudinal axis of the pin 2, and for the sake of convenience, the level may be rotationally mounted about its own longitudinal axis, on the stub shaft 9. The level is a very accurate one, being provided with a very small bubble for properly centering the latter, and determining any deviation from true alignment of the level.

A scale-carrying element, such as a sleeve 11 closely encircles the pin 2 or is otherwise rotatable thereabout, said sleeve being split longitudinally in this instance to receive a tightening screw 12 that seats in and is transverse to the pin at a peripheral channel 13 in the latter, and whereby the sleeve may be frictionally rotatable on the pin, but is prevented from accidentally separating longitudinally therefrom.

A vertically extending rod or shank 14 has its upper end fixed to the sleeve 11 so as to form a vertical bearing and rotational axis for a scale element 15 mounted on said rod, there being a pair of ears 16—16 snugly receiving said rod for that purpose, with a screw 17 for frictionally adjusting the bearing of said ears on said rod or shaft 14.

The scale element is thus rotatably adjustable about the shaft 14 as an axis, from one side of the pin to the other, as indicated in dotted lines in Fig. 2 (wherein one of the side positionings of the scale is shown). Further, the part 15 is provided with a set of calibrations or markings 18 arranged along an arcuate face at the upper end of the scale element and representing degrees of camber and fractional parts thereof, as for example the quarter-degrees shown.

A pointer element 19, preferably having an enlarged base 20, is pivoted to a shaft 21 carried from the scale element 15 at said base, the axis of said shaft 21 being horizontal, so that said pointer may be swung in an arc about said horizontal axis of the shaft 21. The pointer is provided adjacent its upper end with its scribe line 22 for cooperation with the marker indicia of the scale element, the line 22 preferably being flush with the lines 18, so that when the marker or pointer is at any point along the markings 18, the reading then taken is a truly accurate one, and there is no need for special precautions in taking this reading, as would be the case if the line 22 was spaced from the adjacent ends of the markings 18 or above or below the latter. A thumb screw 23 is carried by a lug 24 integral with the scale element, the inner end of said screw bearing against a side of the pointer, and there being a spring 25 interposed between the other side of said pointer and the adjacent side of said scale element to yieldingly resist movement of the pointer in one direction of travel.

A spirit level 25 is arranged horizontally on the base of the pointer, the bubble of the same preferably being small so as to insure a more accurate reading in centering the level.

The device is used in the following manner when it is desired to use it for measuring the camber of an automobile wheel. The device is mounted on one of the studs or bolts of the wheel (or otherwise fixedly secured to said wheel or to the end of the axle thereat), and with the car in a straight-ahead position of the wheels, the car is rolled either forwardly or backwardly, say forwardly in this instance, until the bubble in the top spirit level 8 is exactly centered, and in which position the car is chocked to prevent accidental rolling.

The pointer is set initially with its scribe line exactly at the center or zero of the markings 18, and the scale element together with the various parts carried thereby are rotationally shifted or adjusted about the pin 2 until the bubble of the lower spirit level 25 is exactly centered when in the dotted line position of the parts shown in Fig. 2. A check-up of the bubble centering when the scale and pointer unit is swung to the opposite side of the pin from that shown in Fig. 2, dotted lines, should also show that the centering is accurate on either side of the pin, as well as in the mid-position of the parts shown in full lines in Fig. 2.

Then the automobile is rolled rearwardly for a half-turn of the wheel, and when the bubble of the spirit level 8 is exactly centered, after the level has been rotated about its shaft 9 so as to be then readable in the rolled position of the wheel, it indicates that a true and exact half-turn of the wheel was made, and in which position the wheel is again chocked to hold the same in position for reading of the gauge.

The sleeve, scale and pointer have also been up-ended by this half-turn of the wheel, and must then be swung about the pin 2 until in proper position for reading and manipulation as shown in the drawing, with the rod 14 again depending from the pin. The positioning of the bubble in level 25 at center when the device is in the full line position of Fig. 2, after the half-turn, will indicate that the adjustment of the thumb screw for manipulation of the pointer for a reading may now be taken. The scale element is then swung to the side of the pin opposite from that shown in dotted lines in Fig. 2, and then the thumb screw is turned until the bubble of the level 25 is centered. The reading on the markings of the scale, in line with the scribe line of the pointer at that point represents the number of degrees of camber of the wheel tested.

This manner of construction, wherein the pin or other mounting element 2 is turned equal amounts to either side of the center of the rotary member 1, results in making the reading on the scale twice as accurate as the readings on a protracter of the same arc length as that of the pointer, because when using a protracter, the reading is taken to one side or other of the vertical, while in our device the movement of the element 2 has been from one side of this vertical to the other.

Although but a single level 8 has been indicated and with a movement of the rotary element through a full one-half turn, it is obvious that if it is desired, there may be a different form of levels or more than one level may be used, and the member 1 may be given some predetermined lesser turn than the one-half turn; in which case, however, the calibrations on the scale would be proportionately compensated. The wheel or other member 1 would then be turned from a sixth or eighth, or any other predetermined fractional part of a turn from the vertical, first on one side of the vertical, then to the same fractional part on the other side of the vertical, the upper levels being properly placed to enable true settings of the wheel to the pair of rolled positions.

What I claim as new and desire to secure by Letters Patent is:

1. A tool for measuring the deviations from horizontal alignment of a rotary member, comprising an element adapted to be mounted on said member, levelling means mounted on said element and movable thereby for determining rotational movements of said rotary member alternately equal arcuate distances to both sides of the vertical, the axis of the level of said levelling means extending laterally to the longitudinal axis of said first-mentioned element, a scale pivotally carried by said element, a pointer pivoted to said scale so as to be movable thereacross and cooperate with markings thereon, means for adjustably actuating said pointer relatively of said scale at the alternate rotational movements of said member, and a spirit level on said pointer and movably actuated by the latter to indicate deviations from horizontal.

2. A tool for measuring the deviation from horizontal of a rotary member, comprising means adapted to be mounted on the member, a horizontal spirit level carried by and movable with said means and whose axis extends laterally of the longitudinal axis of the latter to determine an exact half-rotation of said rotary member, a scale pivotally carried by said means as to be swung to both sides of the latter, a pointer pivoted to said scale to be movable across and cooperate with the markings on the latter, means for adjustably actuating said pointer relatively of the scale, and a horizontal spirit level fixed on said pointer.

3. A tool for measuring the camber of a rotatable member, comprising a pin adapted to be fixed on said member, spirit level means carried by and movable with said pin transversely thereof to determine the start and end of an exact part-rotation of said rotatable member to either side of vertical, a scale element carried by said pin, a pointer pivotally carried by said scale to cooperate with the readings on the latter, said pointer being vertical at said starting position of said rotatable member, means for adjustably moving said pointer across said scale to vary the deviation of the latter from a given position, and a second spirit level carried by said pointer to indicate deviation from the horizontal axis of the rotatable member.

4. A tool for measuring the camber of a rotatable member, comprising a pin for mounting on said member, a spirit level carried by said pin and movable therewith and whose axis extends laterally to the axis of the pin so that after an initial horizontal setting of the level and an exact half-turn of said rotatable member the level will again show a horizontal setting, a sleeve rotatably encircling said pin, a vertical rod depending from said sleeve, a scale element horizontally carried by said rod, a pointer element pivotally mounted at one end on said scale element, a horizontal spirit level on said pointer, said pointer adapted to be at the zero mark on said scale at the initial centering of said levels before giving the rotatable member a half-turn, and means for adjustably actuating said pointer until the second spirit level is again truly horizontally positioned after the rotatable member has been given exactly a half-turn.

5. A device for measuring the camber of a wheel, comprising a pin adapted to be mounted to extend horizontally from the latter, a sleeve rotatable on said pin, a vertically extending rod depending from said sleeve, a scale element pivoted to said rod to swing horizontally, a pointer pivoted at its lower end to said scale element to swing to either side of the center of the markings on the latter, means for pivotally adjusting said pointer along the markings of said scale, and a pair of spirit levels on and movable with said pin and pointer respectively, the axis of one of said levels extending laterally to the axis of the pin, whereby after the device is mounted with both levels centered and with the pointer at the zero mark on the scale, the wheel may be given an exact half turn whereupon the level on the pin is again truly horizontal, and the pointer then adjusted until its spirit level is truly centered, so that the degree of camber of the wheel will be represented by the deviation of the pointer from the zero mark on the scale.

HENRY A. BREIHAN.